United States Patent [19]
Mercade

[11] 3,826,365

[45] *July 30, 1974

[54] BENEFICIATING CLAY BY SELECTIVE FLOCCULATION AND MAGNETIC SEPARATION OF IMPURITIES

[75] Inventor: Venancio V. Mercade, Metuchen, N.J.

[73] Assignee: Engelhard Minerals & Chemicals Corporation, Township of Woodbridge, N.J.

[ * ] Notice: The portion of the term of this patent subsequent to Oct. 31, 1989, has been disclaimed.

[22] Filed: June 13, 1972

[21] Appl. No.: 262,266

Related U.S. Application Data

[63] Continuation-in-part of Ser. No. 76,219, Sept. 28, 1970, Pat. No. 3,701,417.

[52] U.S. Cl.......................... 209/5, 209/39, 209/214
[51] Int. Cl............................. B03b 1/04, B03c 1/30
[58] Field of Search................ 209/5, 9, 39, 40, 214

[56] References Cited
UNITED STATES PATENTS

| | | | |
|---|---|---|---|
| 3,372,803 | 3/1908 | DeLisle | 209/5 |
| 3,482,685 | 12/1969 | Malden | 209/5 |
| 3,549,527 | 12/1970 | Peck | 210/223 |
| 3,627,678 | 12/1971 | Marston | 210/42 |
| 3,676,337 | 1/1972 | Kolim | 210/42 |
| 3,701,417 | 10/1972 | Mercade | 209/5 |

FOREIGN PATENTS OR APPLICATIONS

| | | | |
|---|---|---|---|
| 235,591 | 5/1907 | U.S.S.R. | 209/5 |

*Primary Examiner*—Robert Halper
*Attorney, Agent, or Firm*—Melvin C. Flint; Inez L. Moselle

[57] ABSTRACT

Colored titaniferous impurities are removed from a deflocculated aqueous slip of kaolin clay by activating the impurities with polyvalent cations, e.g., calcium ions, selectively flocculating the impurities by addition of a synthetic organic anionic polyelectrolyte and then passing the slip through a high intensity magnetic field, whereby the flocculated impurities are separated from the slip containing brightened purified clay.

10 Claims, No Drawings

BENEFICIATING CLAY BY SELECTIVE FLOCCULATION AND MAGNETIC SEPARATION OF IMPURITIES

RELATED APPLICATIONS

This application is a continuation-in-part of my co-pending application, Ser. No. 76,219 now U.S. Pat. No. 3,701,417, filed Sept. 28, 1970.

BACKGROUND OF THE INVENTION

Wet and dry high intensity magnetic treatments have been used to recover particles having low magnetic susceptibility from ores and ore concentrates. Difficulties have been experienced, however, in applying high intensity magnetic separation to the concentration of extremely finely divided or slimed minerals, e.g., mixtures composed of particles predominantly finer than 10 microns equivalent spherical diameter. For example, it has been proposed to purify and thereby brighten kaolin clay by utilizing high intensity magnetic fields to remove colored paramagnetic impurities (especially yellowish titania) from slips of the impure clay, preferably dispersed slips or suspensions of the clay. While some removal of slimed colored paramagnetic impurities has been achieved, the results have left much to be desired because of the difficulty in retaining the particles on the magnet.

PRIOR ART

Russian Pat. No. 235,591 to Tikhanov discloses a method for removing titaniferous impurities from kaolin clay by using flotation collectors, including fatty acids, to selectively flocculate the impurities in a slip of kaolin clay before magnetic treatment in a filter unit in which steel balls are previously rendered hydrophobic by treatment with a silicone compound. I have found that the use of flotation collectors of the type used by the Russian inventor ruin the steel wool matrix of conventional high intensity magnetic separators because the reagentized impurities adhere to the matrix and cannot be easily flushed from the unit.

U.S. Pat. No. 3,549,527 suggests floccing various suspensions with anionic polymers and applying a magnetic field to settle the flocs which are then removed in conventional manner. U.S. Pat. No. 3,536,198 includes a similar disclosure.

U.S Pat. No. 1,063,893, patented in 1913, long prior to the development of high intensity magnetic separators, discloses a method applicable to removing iron oxide from clay by adding an acid or a base so as to selectively cause one constituent to convert to "gel" state and the other into "sol" state before magnetic treatment. Schwerin was not concerned with removing titania from clay. Titania would not be separated into gels and sols by acid or base addition as suggested by Schwerin and titania is only paramagnetic.

U.S. Pat. No. 3,471,011 to Ianicelli et al suggests purifying kaolin clay by subjecting a slurry of the impure clay to a high intensity magnetic field. An essential feature is that the slurry is dispersed (e.g., deflocculated).

APPLICANT'S INVENTION

A general object of the invention is to improve upon the efficiency of high intensity magnetic separation as a means for removing fine colored titaniferous impurities from a deflocculated slip or suspension of kaolin clay.

A more particular object of the invention is to selectively flocculate impurities in a deflocculated kaolin clay by addition of a small amount of a source of polyvalent cations and a trace amount of anionic polyelectrolyte prior to removing the impurities in a high intensity magnetic separator.

A specific object is to selectively flocculate colored impurities in a deflocculated kaolin slip with reagents which will not cause the flocculated impurities to adhere to the conventionally used steel wool matrix of a high intensity separator, whereby the flocculated impurities may be readily removed from a slip of the clay by passing the deflocculated slip with selectively flocculated impurities through the matrix of a high intensity separator and washing the matrix to remove the clay impurities, whereby the separator is in condition for reuse.

Briefly stated, in accordance with this invention, there is provided a fluid aqueous slip of impure kaolin clay wherein the kaolin clay particles are deflocculated and the particles of impurity are flocculated by adsorption of small amounts of polyvalent cations, preferably calcium ions, and a synthetic organic anionic polymeric flocculant, preferably a weakly ionic acrylamide polymer. This flocculated-deflocculated aqueous slip is subjected to the action of a high intensity magnetic field by passing the slip through a magnetic separator provided with a steel wool matrix, whereby impurities are retained in the field of the magnet and a slip of purified clay is recovered. When sufficient impurities have built up in the matrix of the magnet to make removel desirable, the intensity of the field may be reduced and the unit flushed with a liquid, suitably water, to remove the impurities.

In a preferred embodiment of the invention, a slip of impure kaolin is well deflocculated prior to selectively flocculating the previously deflocculated colored impurities by adding polyvalent cations and polymeric flocculant.

DESCRIPTION OF THE INVENTION

The process is useful in removing titaniferous impurities from clay provided the impurity is discrete and may be liberated from the clay when the impure clay is agitated in aqueous media. Normally the titania impurities in kaolin clay are distinctly yellow or brownish-yellow. Such clays may contain impurities other than titania. In some instances, discrete impurities such as quartz and ferruginous matter are removed along with the titania impurity by the magnetic treatment.

The impure clay is preferably first formed into a dilute welldefloculated slip or suspension whereby both the clay and impurities are deflocculated. Normally grit (e.g., plus 325 mesh matter) is removed before selectively floccing the titaniferous impurities. Unfractionated clay or fine or coarse size fractions of degritted clay may be processed. In a presently preferred embodiment, a deflocculated slip of unfractionated degritted clay is employed and a fine size fraction of purified clay is recovered after impurities are selectively flocculated and removed by high intensity magnetic treatment.

Sodium silicate or hydrosols obtained by mixing small amounts of salts of polyvalent metals with sodium silicate have been used with success as deflocculants in carrying out the process of the invention. Other clay deflocculants include sodium hydroxide, sodium carbonate, ammonia and sodium salts of condensed phosphates. Mixtures of deflocculants may be used. When processing certain clays, such as the hard gray sedimentary Georgia kaolins, a mixture of sodium carbonate and sodium silicate (or metal salt-sodium silicate hydrosol) is recommended. Sufficient deflocculating agent is employed to deflocculate the clay and clay impurities so that the particles remain in suspension, without sedimentation, when maintained under mild agitation or stirring.

Deflocculated fluid slips containing above 5 percent, preferably 2 percent solids, may be employed. The pH of the slips should be within the range of about 7 to 10, preferably within the range of 8.0 to 9.5. When the pH is too low, it may be difficult to maintain the clay particles in the required deflocculated condition during the purification treatment and clay recovery will be adversely affected. On the other hand, the flocculation of titania may be hampered when pH is too high and insufficient separation of titania may result.

To the neutral or mildly alkaline well-deflocculated slip or suspension of impure clay a source of polyvalent cations is added. The source of the polyvalent cations must be one which is sufficiently ionized in the slip to supply an adequate concentration of polyvalent cations. Examples of polyvalent cations are calcium, magnesium, barium, zinc, lead, iron (ferrous and ferric), aluminum, titanium, manganese (manganous and manganic). Oxides, hydroxides and salts of polyvalent metals may be used provided they possess adequate solubility in the deflocculated slip. Metallic salts of monobasic acids, especially monobasic mineral acids and acetic acid, are preferred. Calcium chloride is especially recommended. The optimum concentration of polyvalent metallic cation varies with the species of polyanionic flocculant that is used and it also varies with the concentration of the polyanionic flocculant. Generally, the concentration of polyvalent cation is within the range of 10 to 200 p.p.m., more usually 50 to 100 p.p.m. Good results have been realized when employing a weight ratio of polyvalent cation to anionic polymer within the range of about 25 to 100/1.

It is preferable to add the source of polyvalent metal cations to the deflocculated slip in the form of a dilute aqueous solution, e.g., a solution of 1/4 percent to 2 percent concentration. After addition of such solution, the slip should be thoroughly agitated to assure uniform mixing. High shear mixing is suitable. It is believed that the polyvalent cations are selectively adsorbed by the titaniferous impurity, thereby reducing zeta potential and facilitating flocculation by the high molecular weight anionic polymer. If desired, the polymer may be incorporated into the slip before the source of polyvalent metallic cations.

The anionic polymers used in carrying out the invention have an average molecular weight greater than 10,000 and are incorporated into the slip as dilute (e.g., 0.01 percent to 0.5 percent) aqueous solutions. The term "anionic organic polyelectrolyte" as used herein encompasses synthetic organic polymers which, when placed in an aqueous medium, ionize on the polymer molecule into a substantial number of anionic groups distributed at a plurality of positions on the molecule. Present experience indicates that the polymer should be a weakly anionic polymer rather than a strongly anionic polymer. Weakly anionic polymers contain both anionic and nonionic groups. In this case, anionic properties are imparted to synthetic organic polymers by the presence of side chains of carboxylic acid, carboxylic anhydride and carboxylic acid salt groups. Nonionic groups in a side chain in the polymer result from the presence of one or more of the following hydrophilic groups: carboxylic acid amide, carboxy alkyl ester, pyrrolidone, hydroxy, hydroxy alkyl ether and alkoxy. Preferred because of their commercial availability are high molecular weight weakly anionic synthetic polyacrylamides containing some replacement of amide by carboxylic groups. Such polyelectrolytes are prepared by copolymerization of acrylamide and acrylic acid or by the partial hydrolysis of polyacrylamide. Reference is made to "POLYELECTROLYTE ADSORPTION OF KAOLINITE," A. S. Michaels and O. Morelos, Industrial and Engineering Chemistry, Volume 47, No. 9, page 1802, for a detailed description of a method for synthesizing hydrolyzed polyacrylamide (PAM) and for controlling the extent of partial alkaline hydrolysis.

An extremely low concentration of anionic polymeric flocculant is required to flocculate selectively the impurities in the slip of clay. Generally a concentration within the range of 1/4 to 5 p.p.m., preferably 3/4 to 4 p.p.m., suffices. When the concentration of polyelectrolyte is too low, or when the ratio of polyelectrolyte to metallic cations is too low, flocculation is inadequate. In extreme cases, no floccules form. When the concentration exceeds a desired value, the recovery of purified clay is impaired. At excessive concentrations there may be no selectivity since both the clay and the impurities will be flocculated. An optimum amount or range or synthetic organic polyelectrolyte can be readily determined by routine experimentation.

The pH of the slip may be reduced to a desired value by addition of an acid or acid salt before or after incorporating the synthetic organic polyanionic flocculating agent.

After a solution of synthetic organic polyanionic flocculant has been thoroughly mixed with the slip containing deflocculated clay and impurities, it is usually important to avoid vigorous agitation which will break up flocs and/or degrade the polyanionic substance. However, agitation should be sufficient to maintain the deflocculated clay particles in suspension while the flocs are forming. This mild agitation is continued at least until a visible colored sediment forms. In most instances, floc formation and sedimentation occurs within 10 minutes after incorporating the polyelectrolyte. After the sediment forms, the slip may be aged under quiescent conditions or under mild continuous or intermittent agitation to assure that the finer flocs have time to form. Settling periods up to 48 hours or longer are suitable.

The mibimum field intensity of the magnetic field to which the selectively flocculated clay slip is subjected will, of course, vary with the machine that is employed as well minimum with the threshold intensity of the most feebly magnetic substance to be removed from the pulp and with the pulp retention time (throughput rate) of the pulp through the field. Generally, the field intensity will be at least 1,500 gauss. Preferably with some substances fields of 7,000 gauss and above are used. Intensities of up to 100,000 gauss may be employed. Generally preferred, for economic reasons, are fields up to 20,000 gauss.

After subjecting the clay slip to the action of a high intensity magnetic field, the magnetics may be removed from the magnet and the pulp from the rougher magnetic treatment may be cleaned by further passes through the field.

The organic polymer and polyvalent cations report for the most part in the magnetic concentrate.

Various high intensity wet magnetic separators may be employed.

Further removal of titania and other impurities in the deflocculated slip of the magnetically purified kaolin may be effected by repeating the treatment with polyvalent metal cation and polyelectrolyte and further passage through a magnetic separator.

When processing unfractionated kaolin clay or degritted unfractionated purified clay, the slip of purified clay may be fractionated by conventional means such as sedimentation or centrifugation to recover one or more fine size fractions. Fractionation results in a high brighness fine size fraction and a coarse size fraction which may be less bright than the fine size fraction but which is usually brighter than a coarse size fraction obtained by fractionating the unpurified whole clay.

Removal of colored titania effects a marked increase in clay brightness. In some cases it may be essential or desirable to further brighten the purified clay or a desired size fraction of the purified clay by chemical bleach or bleaches. The bleach reagent that is employed will depend on the nature of the residual impurities in the clay and may be a strong oxidizing agent, a strong reducing agent or combinations thereof. Normally the slip of purified clay is flocculated by addition of an acid or acid salt, and thickened by removal of water before bleaching.

The invention may be more fully understood by the following illustrative examples.

In the examples all parts are on a weight basis unless otherwise indicated. Brightness values represent results obtained by TAPPI Standard Method T-646-m-54, described in TAPPI, October 1954, pages 159 to 160A.

The magnetic unit used in th tests was a Carpco unit which includes a working vertical chamber (cannister) located in the center of a magnetic ring. The cannister was filled with fine stainless steel wool matrix which distributed the magnetic field intensity uniformly over the cross-sectional area of the chamber and provided an extensive surface on which magnetically attracted particles can accumulate. Stainless steel grids maintained the steel matrix in place. The magnet used was of a so-clled "2 inch size," the dimension referring to the nominal diameter of the hole in the center of the magnetic ring through which the cannister was inserted. The cannister was made of stainless steel about 2 inches in diameter by 4½ inches long. Tube fittings and valves on the end of the chamber provide the means for flow direction and control. The volume of the cannister of the Carpco unit was 420 cc. Effective volume was 370 cc.

EXAMPLE

The starting clay was 34.3 percent solids slip of degritted hard gray sedimentary Georgia kaolin clay. This slip was prepared by blunging the crude clay in water and dispersing the blunged clay by adding sodium hydroxide, sodium carbonate and sodium silicate as described in U.S. Pat. No. 3,410,399 to Hunter. The dispersed slip was degritted over a 325 mesh screen and the minus 325 mesh slip was recovered and treated with ozone (3 lbs./ton) to bleach partially the gray clay.

PART A. — SELECTIVE FLOCCULATION ALONE

A sample of the 34.3 percent degritted solids slip containing 200 grams of ozonated clay (dry clay basis) was used in the test. To prepare the slip for selective flocculation, the slip was further deflocculated by adding a hydrosol obtained by mixing 8.0 ml. of "N" sodium silicate solution diluted with water to 5 percent and 3.2 ml. of a 1 percent aqueous solution of alum. After addition of the hydrosol, the slip was intensively agitated for 5 minutes by means of an impeller agitator (3000 r.p.m.) in a Fagergren flotation cell (air inlets closed). A 0.1 percent aqueous solution of $CaCl_2 \cdot 2H_2O$ was added and the slip was agitated for 1 minute. The amount of $CaCl_2 \cdot 2H_2O$ that was added corresponds to 3.8 lbs./ton clay. The calculated $Ca^{++}$ concentration was 0.052 g./l. The pH was about 9 after addition of the salt. A 0.01 percent solution of "Polyhall M-59" was incorporated into the slip in amount of 0.076 lb./ton (concentration of 0.0019 g./l.). "Polyhall M-59" is understood to be partially hydrolyzed polyacrylamide having a molecular weight between about 3 to 5 million and is represented by the suppliers as being a weakly anionic polymeric flocculating agent. After addition of the polyanionc flocculant, the slip was mildly agitated in a Lightnin' Mixer at low speed for 30 minutes. The slip was then allowed to settle, whereby it separated into an upper dispersed phase and a lower dark flocculated phase. A slip of minus 3 micron purified clay was recovered from the supernatant in conventional manner.

The deflocculated slip was then fractionated by sedimentation. A slip of minus 3 micron (equivalent spherical diameter) purified clay was recovered. One portion of the slip of minus 3 micron clay was dried, weighed and analyzed for brightness. Another portion of the slip of minus 3 micron purified kaolin clay was bleached by adding a 1 percent solution of $KMnO_4$ in amount of 2 lbs./ton clay, agitating for 1 hour at 180° F., adding 15 lbs./ton zinc hydrosulfite, agitating for 15 minutes, washing and drying. This slurry was dried and analyzed. Other portions of the minus 3 micron clay were bleached with 6 and 12 lbs./ton zinc hydrosulfite.

The results for the tests are summarized in table form.

PART B. — HIGH INTENSITY MAGNETIC TREATMENT ALONE

Another portion of the 34.3 percent solids slip of ozonated gray kaolin clay was diluted to 5 percent solids with water. It was stirred mildly before passing it upwardly at a rate of 240 ml./minute through a 15,000 gauss field in the magnetic separator. No calcium salt or polymer was added to the slip.

After liquid had passed through the chamber, the power was shut off and water was flushed through the chamber to remove magnetics from the matrix. The magnets were energized and the clay slurry from the rougher cleaner was cleaned by passing it upwardly through a field of 10,000 gauss for 2 minutes.

The cleaned clay slip was then fractionated, flocculated and bleached as in Part A. Results are included in the table.

PART C — SELECTIVE FLOCCULATION AND MAGNETIC TREATMENT IN COMBINATION — PROCESS OF THE INVENTION

Part A. of the example was repeated with another portion of the 34.3 percent solids slip of ozonated clay up to and through the steps of adding calcium chloride and "Polyhall M-59." However, after 30 minutes of agitation, the suspension was passed into the magnetic separator as in Part B. The purified clay slip from the magnetic separator was then fractionated, flocced and bleached, as in Parts A and B.

Data in the table indicate that selective flocculation followed by high intensity magnetic separation produced beneficiated fine clay fractions having higher bleached and unbleached brightness than when either method was used alone. When using the combination of steps, titania removal was significantly better than when using either method alone and iron removal was better than in selective flocculation although less than when high intensity magnetic separation was employed alone. Thus, the combination of treatments was of especial benefit with regard to titania removal and brightness.

EFFECT OF COMBINING SELECTIVE FLOCCULATION WITH HIGH INTENSITY MAGNETIC SEPARATION ON BRIGHTNESS OF KAOLIN CLAY

| | | | −3 micron Fraction of Beneficiated Kaolin | | | | | |
|---|---|---|---|---|---|---|---|---|
| | | | Brightness, % | | | | Composition | |
| | | | | Bleached | | | | |
| Test | Process | Wt. %* | Unbleached | $ZnS_2O_4$, 6 lb./ton | $ZnS_2O_4$, 12 lb./ton | $KMnO_4$, 2 lb./ton & $ZnS_2O_4$, 15 lbs./ton | $TiO_2$, wt. %. | $Fe_2O_3$, wt. % |
| A | Selective Flocculation With $Ca^{++}$ & Polyacrylamide | 56.8 | 87.9 | 89.6 | 89.8 | 90.1 | 0.95 | 1.08 |
| B | High Intensity Magnetic Treatment | 69.1 | 84.3 | 89.5 | 89.5 | 89.7 | 1.10 | 0.82 |
| C | A and B | 47.5 | 88.9 | 90.2 | 90.4 | 90.9 | 0.77 | 0.87 |

*=Recovery, based on weight of clay in −325 mesh slip

I claim:

1. A method for purifying kaolin clay containing finely divided colored titania impurities which comprises mixing said impure clay in water in the presence of a deflocculating agent to form a deflocculated neutral or alkaline clay slip, incorporating a small amount of a soluble compound containing polyvalent metal cations and a water-soluble synthetic organic anionic polymeric flocculant in amount sufficient to flocculate selectively finely divided titania impurities, leaving clay particles deflocculated, agitating the slip until flocs of titania impurities form, passing the slip containing said flocs into a magnetic separator provided with a steel wool matrix that is subjected to a high intensity magnetic field, whereby said flocs of titania impurities are retained in the steel wool matrix of said said separator, and withdrawing the remaining deflocculated slip of purified clay from the separator.

2. The method of claim 1 wherein said polymeric flocculant is weakly anionic and said impure kaolin clay is a sedimentary gray Georgia clay.

3. The method of claim 2 wherein said polymeric flocculant is polyacrylamide containing carboxylic groups.

4. The method of claim 1 wherein said polyvalent cations are divalent.

5. The method of claim 4 wherein said polyvalent cations comprise calcium ions added before incorporation of said polymeric flocculant.

6. The method of claim 1 wherein the clay is deflocculated with a reagent comprising sodium silicate.

7. The method of claim 6 wherein the pH of the slip after addition of said source of polyvalent cations and said polymer is within the range of 8.0 to 9.5.

8. The method of claim 1 wherein said polyvalent cations comprise calcium ions present in concentration within the range of 10 to 200 p.p.m. and the flocculant is weakly anionic polyacrylamide present in concentration within the range of 1/4 to 5 p.p.m.

9. The method of claim 8 wherein the calcium ion concentration is within the range of 50 to 100 p.p.m. and the polyacrylamide concentration is within the range of 3/4 to 4 p.p.m.

10. The method of claim 1 wherein the intensity of the magnetic field is within the range of 7,000 to 20,000 gauss.

* * * * *

UNITED STATES PATENT OFFICE
CERTIFICATE OF CORRECTION

Patent No. 3,826,365     Dated July 30, 1974

Inventor(s) Venancio V. Mercade

It is certified that error appears in the above-identified patent and that said Letters Patent are hereby corrected as shown below:

Column 3 - line 14, "2 percent solids" should read -- 20 percent solids --.

Column 4 - line 14, "acryl" should read -- acrylic --.

Column 5 - line 44, "th" should read -- the --.

Signed and sealed this 29th day of October 1974.

(SEAL)
Attest:

McCOY M. GIBSON JR.
Attesting Officer

C. MARSHALL DANN
Commissioner of Patents